(12) United States Patent
Furukawa et al.

(10) Patent No.: US 6,392,736 B1
(45) Date of Patent: May 21, 2002

(54) METHOD OF MANUFACTURING LIQUID CRYSTAL DISPLAY ELEMENT

(75) Inventors: Keiichi Furukawa, Suita; Masakazu Okada, Kyoto; Tatsuo Taniguchi, Hashimoto, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/631,356

(22) Filed: Aug. 2, 2000

(30) Foreign Application Priority Data

Aug. 3, 1999 (JP) .......................................... 11-219473

(51) Int. Cl.$^7$ ........................... G02F 1/13; G02F 1/341; G02F 1/1339
(52) U.S. Cl. ........................ 349/158; 349/156; 349/32
(58) Field of Search .............................. 349/158, 159, 349/160, 156, 123, 187, 32; 345/37; 156/285

(56) References Cited

U.S. PATENT DOCUMENTS

| | | | |
|---|---|---|---|
| 5,944,934 A | * 8/1999 | Park | 156/285 |
| 5,978,065 A | 11/1999 | Kawasumi et al. | 349/188 |
| 6,014,188 A | * 1/2000 | Yamada et al. | 349/32 |
| 6,266,121 B1 | * 7/2001 | Mitsuhiro et al. | 349/156 |

FOREIGN PATENT DOCUMENTS

| | | | |
|---|---|---|---|
| EP | 0 653 663 A | | 5/1995 |
| EP | 0 772 071 A | | 5/1997 |
| EP | 1081536 A | * | 9/2000 |
| GB | 2 102 977 A | | 2/1983 |
| JP | 07-020479 A | | 1/1995 |

* cited by examiner

*Primary Examiner*—Akm E. Ullah
(74) *Attorney, Agent, or Firm*—Sidley Austin Brown & Wood

(57) ABSTRACT

Method of manufacturing liquid crystal display element includes disposing adhesive on at least one of first and second substrates; disposing spacer particles on at least one substrate; supplying liquid crystal material onto at least one substrate; and fixing the substrates together with adhesive spacer particles and liquid crystal material therebetween. The substrates are fixed together by applying pressure and/or heat to the substrates from an end portion toward the other end portion thereof. An impulse applied to each spacer particle can be between 0.001 gf·sec and 0.1 gf·sec in substrate fixing step. Parameter X relating to heating in fixing step can satisfy 200≦X≦3000, where X=(T−20)/(V·D), T is temperature (°C), V is fixing speed (mm/sec) of substrates, and D is diameter of spacer particles (mm). The spacer particles can occupy an area ratio of 0.003 or more to unit area of the substrate.

31 Claims, 5 Drawing Sheets

METHOD OF MANUFACTURING LIQUID CRYSTAL DISPLAY ELEMENT

This application is based on patent application No. H11-219473 (219473/1999) filed in Japan, the contents of which are hereby incorporated by reference.

BACKGROUND OF THE INVENTION

1. Field of the Invention

The present invention relates to a method of manufacturing a liquid crystal display element in which a liquid crystal material and spacer particles are disposed between substrates.

2. Description of the Background Art

In the field of electronic display devices, liquid crystal display elements have been developed for actual use in a wide range extending from a small information device terminal to a large projection display.

The liquid crystal display element is generally manufactured in such a manner that two glass substrates are fixed together to form a cell while keeping a gap between substrates with spacer particles, a liquid crystal material is filled into the space between the substrates through an inlet after fixing of the substrates, and flat plates are pressed against the substrates from both sides of the substrates to adjust the gap before closing the inlet.

A vacuum filling method is widely used as a method of filling the liquid crystal material into the cell. In the vacuum filling method, the cell provided at its end surface with the inlet is disposed in a vacuum tank, and the pressure in the vacuum tank is reduced to attain a vacuum state in the cells. Then, a liquid crystal material already subjected to vacuum degassing is brought into contact with the inlet within the vacuum tank, and then the pressure outside the cell is restored to an atmospheric pressure so that the cell is filled with the liquid crystal material by the pressure difference.

In recent years, a liquid crystal display element using a film substrate has attracted attention because it allows reduction in thickness of the element itself.

However, the foregoing vacuum filling method, which is used for the cell employing the glass substrates, requires a long time for discharging the air from the cell and for filling the liquid crystal material thereinto, and therefore suffers from a problem of low productivity. In particular, this problem becomes remarkable in the structure using large substrates. Such a problem also arises that an unnecessary liquid crystal material adheres to the cell end surface, resulting in a large loss of the liquid crystal material. Further, when producing a plurality of the liquid crystal display element, a plurality of the inlet of the cell are brought into contact with the liquid crystal material in a reservoir, and thereby a plurality of cells are immersed several or many times in the liquid crystal material in the reservoir, and resulting in that the liquid crystal material in the reservoir is polluted.

If the liquid crystal display element using the film substrate is produced with the vacuum filling method, both the operations of discharging the gas and filling the liquid crystal material require more time than those for the display element using the glass substrates, because the film substrate has flexibility. In particular, this problem becomes remarkable when both of the substrates are the film substrates.

Therefore, such a method has been proposed that the film substrate is temporarily fixed to a glass substrate or the like for forming the cells, and then the liquid crystal material is filled thereto. However, this method requires complicated operations for fixing the film substrate to the glass substrate, and removing it from the glass after filling the liquid crystal material. Further, the film substrate may be damaged or deformed. It is also necessary to set the optimum conditions for fixing the film substrate to the glass substrate. Problems other than the above may also arise. In the above method of fixing the film substrate to the glass for manufacturing the liquid crystal display element, increase in number of steps as well as complication thereof are unavoidable, and the larger size of the substrate makes the manufacturing more difficult.

For good display, the thickness of the liquid crystal material must be constant in each portion of the liquid crystal display element. For this, the liquid crystal display element is generally provided with spacer particles located between the substrates for controlling the distance (gap) between the substrates holding the liquid crystal material therebetween, and thereby for keeping the constant thickness of the liquid crystal material in each portion. However, these manners cannot yet sufficiently achieve the uniformity in gap between the substrates, and therefore the uniformity in thickness of the liquid crystal material.

SUMMARY OF THE INVENTION

An object of the invention is to provide a novel method of manufacturing a liquid crystal display element provided with spacer particles and a liquid crystal material disposed between a pair of substrates.

More specifically, an object of the invention is to provide a method of manufacturing a liquid crystal display element, which achieves simple manufacturing steps, short manufacturing time and high productivity.

Another object of the invention is to provide a method of manufacturing a liquid crystal display element, which achieves simple manufacturing steps, short manufacturing time, high productivity and sufficient uniformity in distance (gap) between the substrates.

Still another object of the invention is to provide a method of manufacturing a liquid crystal display element, which achieves simple manufacturing steps, short manufacturing time, high productivity and sufficient suppression of occurrence of bubbling between the substrates.

The invention provides a method of manufacturing a liquid crystal display element provided with spacer particles and a liquid crystal material disposed between first and second substrates.

The method of manufacturing a liquid crystal display element according to the invention essentially comprising:
 an adhesive material disposing step of disposing an adhesive material on a predetermined portion of at least one of the first and second substrates;
 a spacer particle disposing step of disposing the spacer particles on at least one of the first and second substrates;
 a liquid crystal material supplying step of supplying the liquid crystal material onto a predetermined portion of at least one of the first and second substrates; and
 a substrate fixing step of fixing the first and second substrates together with the adhesive material, the spacer particles and the liquid crystal material therebetween.

In the method of manufacturing a liquid crystal display element according to the invention, a flexible substrate is used for at least one of the first and second substrates.

In an aspect of the method of manufacturing the liquid crystal display element according to the invention, the substrate fixing step is performed in such a manner that the first and second substrates are fixed together by applying a pressure to the first and second substrates from an end portion toward the other end portion thereof under a condition that an impulse F applied to each of the spacer particles is in a range from 0.001 gf·sec to 0.1 gf·sec.

In another aspect of the method of manufacturing the liquid crystal display element according to the invention, the substrate fixing step is performed in such a manner that the first and second substrates are fixed together by applying a pressure and a heat to the first and second substrates from an end portion toward the other end portion thereof; and a parameter X relating to the heating in the substrate fixing step satisfies a relationship of $200 \leq X \leq 3000$, where $X=(T-20)/(V \cdot D)$, T is a heating temperature (°C.), V is a fixing speed (mm/sec) of the first and second substrates, and D is a diameter of the spacer particle (mm).

In still another aspect of the method of manufacturing the liquid crystal display element according to the invention, the substrate fixing step is performed in such a manner that the first and second substrates are fixed together by applying a pressure to the first and second substrates from an end portion toward the other end portion thereof; and the spacer particle disposing step is performed to dispose the spacer particles such that the spacer particles, to be located between the first and second substrates in the substrate fixing step, occupy an area at a ratio S of 0.003 or more to a unit area of the substrate.

In any of the above mentioned manufacturing methods, some of the steps may be executed simultaneously. For instance, the adhesive material disposing step and the spacer particle disposing step may be executed simultaneously by adding the spacer particles in the adhesive material before disposing the adhesive material and spacer particles to at least one of the first and second substrates. Alternatively or in addition, the spacer particle disposing step may be simultaneously executed with the liquid crystal material supplying step by adding the spacer particles in the liquid crystal material before performing these steps. As to the liquid crystal supplying step, this step may be executed before or during the substrate fixing step.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
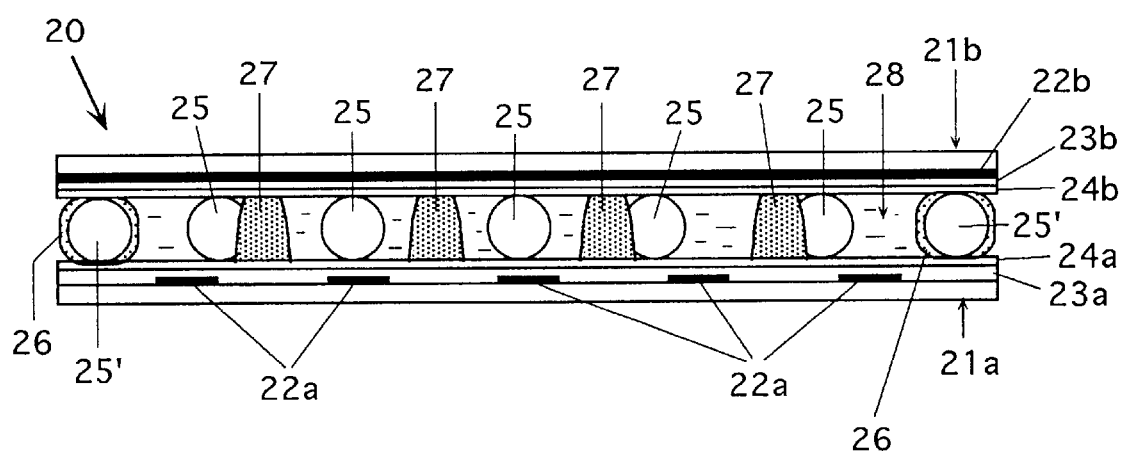
FIG. 1 is a cross section showing a schematic structure of an example of a liquid crystal display element to be produced according to a method of the invention.

[1] The invention provides first, second and third types of method of manufacturing a liquid crystal display element.

[1-1] First, description will be given on contents common to the first, second and third types of method of manufacturing the liquid crystal display element.

In any one of the first to third types of the method of manufacturing the liquid crystal display element, the liquid crystal display element, having spacer particles and a liquid crystal material disposed between first and second substrates, is produced.

In any one of the first to third types of the method of manufacturing the liquid crystal display element, a flexible substrate is used for at least one of the first and second substrates. In the following description, the second substrate is the flexible substrate. The first substrate may have or may not have the flexibility. Thus, both the first and second substrates may be flexible substrates.

Any one of the first to third types of the method of manufacturing the liquid crystal display element includes an adhesive material disposing step, a spacer particle disposing step, a liquid crystal material supplying step and a substrate fixing step. Any one of the first to third types of the method of manufacturing the liquid crystal display element may include a resin structure forming step. These steps will now be described.

(a) Adhesive Material Disposing Step

In the adhesive material disposing step, an adhesive material is disposed on a predetermined portion of at least one of the first and second substrates.

The adhesive material is typically a seal material for forming a seal wall. The seal wall is provided for preventing leakage of the liquid crystal material from the region between the substrates. The seal material may be supplied to a periphery or fringe portion of the substrate to form the seal wall. In other words, the seal wall made of the seal material may be disposed in a position surrounding the liquid crystal material held between the substrates. The seal material may be a material selected from various kinds of material such as thermoplastic resin or thermosetting resin. In the case where the seal material is the thermoplastic or thermosetting resin, heat may be applied to the substrates in the substrate fixing step, which will be described later. The seal wall may contain the spacer particle for controlling a distance between the substrates.

The adhesive material disposing step may be typically performed before the substrate fixing step.

(b) Spacer Particle Disposing Step

In the spacer particle disposing step, the spacer particles are disposed on at least one of the first and second substrates. After the first and second substrates are fixed together, the spacer particles are located between the first and second substrates, and serve to control a gap between the first and second substrates, and thereby thickness of the liquid crystal material.

The spacer particles may be disposed on the substrate by spraying or dispersing them in a known spray method such as a dry spray method or a wet spray method. Spray of the spacer particles may be typically performed before the substrate fixing step.

The spacer particles may be dispersed in the liquid crystal material, which is to be supplied onto the substrate in the liquid crystal material supplying step, so that the spacer particles may be disposed on the substrate simultaneously with supply of the liquid crystal material.

(c) Liquid Crystal Material Supplying Step

In the liquid crystal material supplying step, the liquid crystal material is supplied to a predetermined portion of at least one of the first and second substrates.

The liquid crystal material may be supplied onto the substrate, e.g., by dropping the liquid crystal material. The liquid crystal material may be supplied to the whole surface of the substrate or only a predetermined portion (e.g., an end portion) of the substrate. This supply of the liquid crystal material may be performed before the substrate fixing steps.

The liquid crystal material may be supplied to a position between the substrates before and/or during performing the substrate fixing step. More specifically, the liquid crystal material may be supplied to the position between the substrates, before and/or during fixing the first and second substrates from an end portion to the other end portion.

If the liquid crystal material is supplied during fixing of the substrates, it is not necessary to supply continuously the liquid crystal material throughout the substrate fixing step, but may be supplied during at least a part of the period of the substrate fixing step. For example, the liquid crystal material may be supplied only at the start of the substrate fixing operation, or during a period from the start of the substrate fixing operation to an intermediate point of the fixing period (e.g., immediately before the end of the substrate fixing operation).

(d) Substrate Fixing Step

In the substrate fixing step, the first and second substrates are fixed together with the adhesive material, the spacer particles and the liquid crystal material therebetween. The first and second substrate are fixed together by adhering the adhesive material to the first and second substrates.

By fixing the first and second substrates together, the adhesive material, spacer particles and liquid crystal material are located between the first and second substrates. The spacer particles control the gap between the substrates (i.e., the thickness of the liquid crystal material).

Any one of the first to third types of the method of manufacturing the liquid crystal display element according to the invention, the first and second substrates are fixed together by applying a pressure to the first and second substrates from an end portion to the other end portion of the substrates.

In the second type of the manufacturing method according to the invention, not only the pressure but also a heat is applied to the substrates during fixing of the substrates. In the second type of the manufacturing method, the substrate fixing step is performed to fix the first and second substrates together by applying the pressure and the heat to the first and second substrates from an end portion to the other end portion of the substrates. In the first and third types of manufacturing methods, both the pressure and the heat may be applied during fixing of the first and second substrates.

The first and second substrates may be fixed together while applying the pressure, e.g., as described in the following items (d1) or (d2). In the following description, the second substrate is the flexible substrate among the first and second substrates. The first substrate may have or may not have the flexibility.

(d1) For example, the first substrate is supported and kept flat by a support member. Then, the flexible second substrate is bent, and an end portion of the second substrate is overlapped with the first substrate supported by the support member with the adhesive material, the spacer particles and the liquid crystal material therebetween. One or more pressing members are moved relatively to the first substrate supported by the support member. Thereby, the pressing member presses the flexible second substrate to the first substrate from an end portion to the other end portion of the substrate. Thereby, the first and second substrate are fixed together.

The support member supporting the first substrate in the flat fashion may have, e.g., a flat surface.

The pressing member may be a pressing roller. Two or more pressing members may be employed.

When fixing the substrates together, it is merely required that the pressing member moves relatively to the support member. Therefore, either or both the pressing member and the support member may be moved.

When fixing the first and second substrates together in the above manner, the liquid crystal material may be supplied to at least one of the substrates before fixing the substrates together.

In the case where the pressure and heat are applied to the substrates to be fixed, such a manner may be employed that a least one heating member is moved relatively to the first substrate supported by the support member, and thereby the first and second substrates are fixed together while the heat is applied, from the second substrate side, to the first and second substrates from an end portion toward the other end portion of the substrates.

The heating member may be provided at its surface or inside with a heating element. The heating member may be a heating roller internally provided with the heating element. Two or more heating members may be employed. The heating member may be in contact with, or may be spaced from the second substrate. Employment of the heating member in contact with the second substrate can achieve a high heating efficiency. The heating member may also serve as the pressing member. More specifically, a pressing and heating member (e.g., pressing and heating roller) for performing both the pressing and heating may be used for pressing and heating the substrate. In the case where a plurality of pressing members are employed for applying the pressure during the fixing operation, one or more of these pressing members may also serve as the pressing and heating member(s) performing both the pressing and heating.

In the case where the heating is performing during the substrate fixing, the heat may be applied from the side of the support member supporting the first substrate. In this case, the support member may be configured to generate heat. Naturally, the heat may be applied from both sides of the first and second substrates for fixing the substrates.

(d2) The first and second substrates may be fixed together in such a manner that the first and second substrates are overlapped from an end portion toward the other end portion of the substrates, with the adhesive material, the spacer particles and the liquid crystal material therebetween, by passing the first and second substrates through a position between first and second pressing members opposed to each other.

The pressing member may be a pressing roller or a pressing belt.

By passing the first and second substrates through the position between the first and second pressing members (e.g., through a nip between the first and second pressing members), the first and second substrates are overlapped, and thereby the first and second substrates are fixed together. For passing the substrates through a position between the pressing members, the pressing members may be moved relatively to the substrates in a stationary position, or the substrates may be moved relatively to the pressing members in a stationary position. Both the substrates and the pressing members may be moved.

The plurality of pressing member pairs each formed of the first and second pressing members may be employed for pressing the substrates during fixing.

When fixing the substrates together while applying the pressure and heat thereto, at least one of the pressing members may serve also as the heating member. The pressing member also serving as the heating member, i.e., pressing and heating member, may apply the pressure and heat to the first and second substrates from an end portion toward the other end portion thereof. When the substrates are being fixed together while applying the pressure to the substrates with a plurality of pressing member pairs as already described, at least one of the pressing members of at least one of the pressing member pairs may also serve as the heating member.

When employing, e.g., the pressing roller pair as the pressing member pair, the pressing rollers may have horizontal axes, respectively, and the first and second substrates may be passed through the pressure roller pair in the vertical direction from the upper side toward the lower side for fixing the substrates together.

In the case where the first and second substrates are fixed together by passing these substrates through the pressure member pair, the liquid crystal material may be supplied to a position between the substrates during fixing the first and second substrates from an end portion toward the other end portion thereof.

In any one of the cases where the substrates are fixed together by the manners described in the foregoing items (d1) and (d2), respectively, or by the other manners, it is preferable to bend the flexible substrate while fixing the substrates together. More specifically, for the purposes of, e.g., ensuring an escape route of bubbles, it is preferable that the entire surfaces of the first and second substrates are not overlapped at a time, but the first and second substrates are overlapped from an end portion toward the other end portion thereof. By bending the flexible substrate, it is possible to overlap the first and second substrates from an end portion to the other end portion. By applying a pressure to the varying position where the first and second substrates are overlapped, the bubbles between the first and second substrates are discharged while the first and second substrates are being fixed together. This suppresses the remaining of the bubbles between the substrates, which provides the liquid crystal display element capable of better display.

If only the second substrate is flexible, the flexible second substrate is bent, and the second substrate is fixed to the first substrate. If both the first and second substrates are flexible, at least one of the first and second substrates is bent when fixing them together from an end portion to the other end portion.

(e) Resin Structure Forming Step

In the resin structure forming step, resin structures are formed on at least one of the first and second substrates. The resin structure forming step may be typically performed before the substrate fixing step.

After the first and second substrates are fixed together, the resin structure is located between the first and second substrates.

The resin structures together with the spacer particles can serve to maintain the predetermined gap between the substrates. The resin structures are desirably adhered to the substrate for reliably maintaining the predetermined distance between the substrates. In this case, the material of the resin structure also operates as the adhesive material. The resin structure may be made of, e.g., thermoplastic resin, and this resin structure can be adhered to each of the first and second substrates by heating the first and second substrates during fixing in the substrate fixing step.

In any one of the foregoing types of the manufacturing method according to the invention, the resin structure forming step may be performed or may not be performed, as already described. The resin structure formed between the substrates can increase the whole strength of the liquid crystal display element, and can improve the uniformity in gap between the substrates.

[1-2] In any one of the types of the manufacturing method according to the invention, as already described, since the liquid crystal material is disposed between the substrates without using a vacuum filling method, the liquid crystal display element can be manufactured more simply with good productivity within a short time. Even in the case where the resin film substrate is used as the substrate, or even in the case where the liquid crystal display element has large sizes, the liquid crystal display element can be manufactured with good productivity.

[2] The inventors have further studied the method of manufacturing the liquid crystal display element described above, and have found the following.

Appropriate ranges are present for the pressure to be applied in the substrate fixing step; the substrate fixing speed; the heating temperature for heating, if performed, in the substrate fixing step; the density of the spacer particles disposed between the substrates; and the particle diameters of the spacer particles and others. By setting these conditions within appropriate ranges, the gap between the substrates can be more uniform, and generation of bubbles between the substrates can be further suppressed. These will be described detail as follows.

(A) The uniformity in gap between the substrates and others are closely related to the pressure (pushing force) applied in the substrate fixing step, the substrate fixing speed and the density of the spacer particles disposed between the substrates.

The above substrate fixing speed is particularly as follows. In the operation of fixing the substrates together by applying the pressure to the substrates from an end portion to the other end portion, the substrate portion receiving the pressure moves, and the speed of movement of the substrate portion receiving the pressure, i.e., a pressure moving speed, is the above substrate fixing speed. In the case where the pressing member applies the pressure from an end portion to the other end portion of the substrates when fixing the substrates, the above substrate fixing speed (pressure moving speed) is the speed of movement of the pressing member relative to the substrates. This speed affects the time for which each portion of the substrate is receiving the pressure.

In the case where the pressure (pressing force) is large, or in the case where the substrate fixing speed (pressure moving speed) is small, the pressure applied to both the substrates per time is large so that it is necessary to use a large amount of spacer particles for keeping the predetermined gap between the substrates.

However, provision of the large amount of spacer particles on the substrate increases the cost, and reduces the area of the display region, and thus the display performance reduces. Further, an excessive pressure may destroy the spacer particles and/or the substrates. In the case where the spacer particles are disposed in advance on the substrate before performing the substrate fixing step, the excessive pressure may move the spacer particles because each portion of the substrate are subjected to the pressure (e.g., by the movement of the pressing member relative to the substrate) in the substrate fixing step, and therefore the excessive pressure may cause irregularities in gap between the substrates.

In the case where the substrate fixing speed (pressure moving speed) is small, the bubbles are liable to remain between the substrates.

In the case where the pressure (pressing force) is small, or the substrate fixing speed (pressure moving speed) is large, the pressure applied to both the substrates during a unit time is low so that the uniformity in gap between the substrates fixed together is low. If the substrate fixing speed (pressure moving speed) is excessively large, the liquid crystal material cannot be spread uniformly over the whole space between the substrates, and an unfilled region is left.

(B) When the heat is applied to the substrates in the substrate fixing step, the heat changes the volume of the liquid crystal material. An excessively high heating temperature increases the volume expansion of the liquid crystal material, and thereby a large volume shrinkage occurs when the temperature of the liquid crystal material lowers after fixing of the substrates, and therefore bubbling occurs.

This change in volume of the liquid crystal material is related to not only the heating temperature, but also the substrate fixing speed in the substrate fixing step as well as the spacer particle diameter.

The substrate fixing speed in the above description is particularly as follows. In the operation of fixing the first and second substrates together while applying the heat to the substrates from an end portion to the other end portion thereof, the substrate portion receiving the heat moves, and the speed of movement of the substrate portion receiving the heat, i.e., a heating moving speed, is the above substrate fixing speed. In the case where the substrates are fixed together while applying the heat to the substrates from an end portion to the other end portion with the heating member, the substrate fixing speed (heating moving speed) is the moving speed of the heating member relative to the substrates. This speed affects the time for which the respective substrate portions are subjected to the heat.

If the substrate fixing speed (heating moving speed) is small, a large amount of heat is supplied to the liquid crystal material, and therefore a large volume expansion of the liquid crystal material will occur. If the spacer particle diameter is small, the thickness of the liquid crystal material is small, and thereby the heat can be efficiently transmitted to the whole liquid crystal material, and thus a large volume expansion will occur.

If the heating temperature is low in the case where the resin structure is disposed between the substrates, a melting adhesivity of the resin structure to the substrates lowers so that the substrate may be peeled off later. The fixing speed (heating moving speed) likewise affects the transmission of heat to the resin structure, and thus affects the adhesivity.

(C) Occurrence of bubbles between the substrates and others are closely related to the density of the spacer particles and the spacer particle diameter.

If the density of the spacer particles is excessively small, the substrate is bent due to the pressure which is applied to the first and second substrates in the substrate fixing step. In the case where the heat is applied to the substrate during fixing, the substrates are bent due to the pressure and heat if the density of the spacer particles disposed between the substrates is excessively small. As described above, when the substrates are bent due to the excessively small density of the spacer particles, the gap between the substrates excessively decreases. As a result, the amount of the liquid crystal material disposed between the substrates becomes smaller than that in the case where the spacer particles are disposed with an appropriate density, and the whole volume of the liquid crystal display element decreases. When the volume shrinkage of the liquid crystal material occurs, e.g., due to lowering in temperature after completion of the liquid crystal display element, further compression of the liquid crystal display element is unlikely to occur because the whole volume thereof is still small. Therefore, bubbling is likely to occur in the display element.

Even in the case where the density of the spacer particles is small, if the spacer particle diameter is large, the bending of the substrate is suppressed in the substrate fixing step, and thereby the predetermined amount of liquid crystal material can be disposed between the substrates. Therefore, the foregoing problem can be suppressed.

The first to third types of the method of manufacturing the liquid crystal display element according to the invention have been developed based on the knowledge and findings described in the foregoing items (A), (B) and (C), and each type of the manufacturing method will now be successively described.

[2-1] First Type of Method of Manufacturing the Liquid Crystal Display Element

The first type of method of manufacturing the liquid crystal display element is based on the foregoing knowledge described in the item (A).

In the first type of manufacturing method, the substrate fixing step is performed such that the first and second substrates are fixed together by applying the pressure to the first and second substrates from an end portion to the other end portion thereof, and an impulse F applied to each spacer particle in the pressing operation is in a range satisfying a relationship of $0.001 \text{ gf·sec} \leq F \leq 0.1 \text{ gf·sec}$.

The impulse F (gf·sec) applied to each spacer particle is expressed by the following formula:

$$F=P/(V \cdot N) \text{ [gf·sec]}$$

where P (gf/mm$^2$) is the pressure applied to the substrates, e.g., by the pressing member. V (mm/sec) is the substrate fixing speed (pressure moving speed) described in the foregoing item (A). N (pcs/mm$^2$) is the density of the spacer particles, i.e., the number of spacer particles per unit area of the substrate.

By setting the impulse F within a range between 0.001 gf·sec and 0.1 gf·sec, the distance (gap) between the substrates can be kept uniform throughout the whole display element.

If the impulse F is smaller than the above range, the pressure is insufficient so that irregularities occur in distance between the substrates. If the impulse F exceeds the above range, the pressure is excessively large so that breakage of the spacer particles and/or the substrates as well as flow of the spacer particles may occur, resulting in irregularities in gap between the substrates.

The pressure P is preferably in a range from 20 gf/mm$^2$ to 100 gf/mm$^2$.

The substrate fixing speed (pressure moving speed) is preferably in a range from 10 mm/sec to 50 mm/sec.

In the spacer particle disposing step, the density N of the spacer particles, to be located between the substrates in the substrate fixing step, is preferably in a range from 50 pcs/mm$^2$ to 400 pcs/mm$^2$.

In the first type of method of manufacturing the liquid crystal display element, the pressure and the heat may be applied to the substrates during fixing of the substrates.

[2-2] Second Type of Method of Manufacturing the Liquid Crystal Display Element

The second type of method of manufacturing the liquid crystal display element is based on the foregoing knowledges described in the item (B).

In the second type of method of manufacturing the liquid crystal display element, the substrate fixing step is performed such that the first and second substrates are fixed together while applying the pressure and the heat to the first and second substrates from an end portion to the other end portion, and the parameter X relating to this heating in the fixing step satisfies a relationship of $200 \leq X \leq 3000$.

The parameter X which is an index of the heating is expressed by the following formula:

$$X=(T-20)/(V \cdot D)$$

where T (°C.) is a heating temperature. If the heating member is used for heating, the temperature T may be, e.g., the heating temperature of the heating member. V (mm/sec) is the substrate fixing speed (heating moving speed) described in the foregoing item (B). D (mm) is the diameter of the spacer particle.

By setting the parameter X to satisfy the relationship of $200 \leq X \leq 3000$, irregularities in gap between the substrates, bubbling as well as failure in adhesion of the resin structures, if employed, to the substrates are prevented.

If the parameter X is excessively small, failures occur in adhesion of the adhesive material and the resin structures, if employed, to the substrates, resulting in a problem that the fixed substrate peels off.

An excessively large value of the parameter X is liable to cause disadvantages such as bubbling in the liquid crystal material.

The substrate fixing speed V (heating moving speed) is preferably in a range from 10 mm/sec to 50 mm/sec.

The heating temperature T is preferably in a range from 120° C. to 160° C.

The diameter D of the spacer particle is preferably in a range from $4 \times 10^{-3}$ mm to $10 \times 10^{-3}$ mm, i.e., in a range from 4 μm to 10 μm.

[2-3] Third Type of Method of Manufacturing the Liquid Crystal Display Element

The third type of method of manufacturing the liquid crystal display element is based on the foregoing knowledge described in the item (C).

In the third type of method of manufacturing the liquid crystal display element, the substrate fixing step is performed such that the first and second substrates are fixed together while applying the pressure to the first and second substrates from an end portion to the other end portion thereof. In the spacer particle disposing step, the spacer particles are disposed such that the spacer particles, to be located between the substrates in the substrate fixing step, occupy an area to a unit area of the substrate at the area rate S of 0.003 or more.

The rate S of the spacer particle area to the unit substrate area is expressed by the following formula:

$$S=\pi \cdot (D/2)^2 \cdot N$$

where D is the spacer particle diameter, and N is the density of the spacer particles, i.e., the number of spacer particles per unit substrate area.

By setting the parameter S to 0.003 or more, bending of the substrate can be suppressed in the substrate fixing step, and therefore the bubbling can be suppressed.

If the parameter S is smaller than 0.003, the substrate is bent in the substrate fixing step, and the volume of the produced liquid crystal display element is reduced. When the volume shrinkage of the liquid crystal material occurs due to, e.g., lowering in temperature after production of the display element, the bubbling is liable to occur.

The upper limit of the parameter S may be equal to about 0.05, e.g., in view of ensuring of good visibility, although not restricted thereto.

In any case, the density of the spacer particles is preferably in a range from 50 pcs/mm² to 400 pcs/mm².

The diameter D of the spacer particle is preferably in a range from 4 μm to 10 μm.

In the third type of method of manufacturing the liquid crystal display element, the substrate fixing may be performed while applying the pressure and the heat to the substrate pair as already described.

Two or more of the ranges of the parameters F, X and S, which are employed in the first to third types of the method of manufacturing the liquid crystal display element already described, may be combined unless a problem arises.

[3] Embodiment of the Invention will now be Described with Reference to the Drawings.

First, description will be made on a liquid crystal display element to be manufactured by the manufacturing method according to the invention. FIG. 1 is a schematic cross section of a structure of the liquid crystal display element.

The liquid crystal display element shown in FIG. 1 is a liquid crystal display element 20 which is configured to turn on/off a large number of pixels for displaying images.

The liquid crystal display element shown in FIG. 1 has a pair of substrates 21a and 21b, and a space between the substrates 21a and 21b is filled with liquid crystal composition (liquid crystal material) 28 as a light modulation layer. Transparent electrodes 22a and 22b taking the form of a matrix are formed on the substrates 21a and 21b, respectively. If desired, insulating films 23a and 23b as well as alignment films 24a and 24b are formed on the electrodes 22a and 22b, respectively. Spacer particles 25 are disposed between the substrates 21a and 21b for keeping the gap between the substrates. The peripheries of the substrates 21a and 21b are adhered together by seal resin 26 containing spacer particles 25'. In a display region, resin structures 27 adhering both the substrates 21a and 21b are arranged for supporting the substrates 21a and 21b.

In the liquid crystal display element 20, crossing points of the matrix formed by the electrodes 22a and 22b serve as display pixels. The liquid crystal composition 28 performs the light modulation in the matrix form, and the region where this light modulation is performed is the display region. The resin structures 27 are arranged at least in this display region.

Each of the substrates 21a and 21b is preferably made of a light transmitting material. If at least one of the substrates 21a and 21b has flexibility, the other need not have flexibility, and may be made of glass. The substrates 21a and 21b are merely required to transmit therethrough the light in a certain wavelength range within the visible light range. As a word meaning this property, "transparent" may be used in the following description. In the case of the liquid crystal display element of a reflective type, one of the substrates 21a and 21b is required to be transparent, and the other may be an opaque substrate such as a substrate provided with an opaque film of metal, organic material or inorganic material, a metal substrate or a plastic substrate. The transparent and flexible substrate may be a film substrate made of polycarbonate, polyether sulfone (PES), polyacrylate, annular amorphous polyolefin.

The transparent electrodes 22a and 22b may be formed from, e.g., a transparent electrode material such as ITO (Indium Tin Oxide) in a known method.

The insulating films 23a and 23b as well as the alignment films 24a and 24b are successively formed on the surfaces, on which the electrodes are arranged, of the substrates, if necessary. These insulating films and the alignment films are employed, when necessary. These insulating films and the alignment films may be made of an inorganic material such as silicon oxide or an organic material such as polyimide resin, respectively, and may be formed by a known method such as a sputtering method, a spin coat method or a roll coat method. One kind of films, i.e., only the insulating films or the alignment films, may be employed. Alternatively, the insulating films or the alignment films may be formed on only one of the substrates. Further, rubbing may be effected on the alignment films, if necessary.

The spacer particles 25 are preferably made of a hard material which is not deformed by the heat and pressure. For example, the spacer particles 25 may be made of, e.g., an inorganic material such as finely divided glass fibers, silicate glass in the ball-like form or alumina powder, or spheric particles of an organic material such as divinylbenzene-contained cross-linked polymer or polystyrene-contained cross-linked polymer. These spacer particles may have surfaces coated with resin. Spray or dispersion of the spacer particles 25 may be performed in a known method of either a dry type or a wet type.

In this embodiment, the particle diameter of the spacer particle 25 is in a range from 4 $\mu$m to 10 $\mu$m. The density of the spacer particles between the substrates 21$a$ and 21$b$ is in a range from 50 pcs/mm$^2$ to 400 pcs/mm$^2$, and more preferably in a range from 120 pcs/mm$^2$ to 400 pcs/mm$^2$.

The seal resin 26 can be selectively made of various materials provided that the liquid crystal composition 28 can be sealed within the liquid crystal display element, and is generally and preferably made of, e.g., ultraviolet-curing resin or thermosetting resin. In particular, if the thermosetting resin such as epoxy resin is used as the seal resin, a high sealing performance can be kept for a long term. The seal resin 26 may be made of the same polymer material as the resin structure 27.

The seal resin (seal wall made of the seal resin) 26 may be formed on the peripheral portion of the substrate 21$a$ or 21$b$ in various methods, e.g., a dispenser method or an ink-jet method in which the resin is supplied onto the substrate from a nozzle, a printing method using a screen plate, a metal mask or the like, or a transfer method in which the resin is arranged on a flat plate or a roller in a predetermined configuration, and then is transferred onto the substrate.

The seal resin 26 may have an annular form continuously extending along the periphery of the substrate 21$a$ or 21$b$. In the liquid crystal display element manufacturing method according to the invention, the liquid crystal material may be dropped onto at least one of the substrates before fixing the two substrates together, as will be described later. Therefore, the space between the substrates can be filled with the liquid crystal material without providing an opening in the seal resin (seal wall) 26 for supplying or discharging the liquid crystal material. However, the seal resin (seal wall) 26 may be provided with such an opening. The opening may be closed, e.g., with ultraviolet-curing resin after filling the space with the liquid crystal material. The seal resin (seal wall) 26 may preferably have a line width in a range from about 10 $\mu$m to about 1000 $\mu$m.

Spacer particles 25' contained in the seal resin 26 may be made of the same material as the spacer particles 25. The spacer particles 25' may have a size different from that of the spacer particles 25 arranged in the display region. However, the thicknesses of the insulating film and the alignment film, the thickness of the electrode and the thickness of the liquid crystal composition layer are much smaller than the size in the plane direction of the liquid crystal display element. Therefore, the spacer particles contained in the seal resin may have the same size as that of the spacer particles arranged in the display region without causing problems such as a problem that the liquid crystal composition layer cannot have a uniform thickness.

The resin structure 27 may be made of thermoplastic resin. The thermoplastic resin may be polyvinyl dichloride resin, polyvinylidene chloride resin, polyvinyl acetate resin, methacrylate ester resin, polyacrylate ester resin, polystyrene resin, polyamide resin, polyethylene resin, polypropylene resin, fluororesin, polyurethane resin, polyacrylonitrile resin, polyvinyl ether resin, polyvinyl ketone resin, polyester resin, polyvinyl pyrolidone resin, saturated polyester resin or the like. The resin structure 27 may be made of one of the above materials, or a mixture containing one of the above materials. The resin structure 27 may be made of a pressure-sensitive adhesive, which produces an adhesive force when a pressure is applied thereto. The pressure-sensitive adhesive may be made of, e.g., aqueous emulsion of acrylic resin. An aqueous pressure-sensitive adhesive "Three Bond 1546" (manufactured by Three Bond Corp.) is an example of such an adhesive.

In the case where the ultraviolet-curing resin is used as the material of the resin structure 27, the resin is disposed on an intended position, e.g., by screen printing, and then is irradiated with ultraviolet rays for curing at least the surface thereof before fixing the substrates 21$a$ and 21$b$ together. This manner can be employed for any kind of ultraviolet-curing resin such as acrylic resin or epoxy resin, and also can be appropriately employed for the seal resin of the ultraviolet-curing type as well as the seal material for closing openings used in manufacturing of the liquid crystal panel.

The resin structure 27 may be arranged to have the appropriate configuration, sizes, pitch and arrangement pattern so that the resin structure 27 in the cured state can appropriately support the two substrates spaced by a predetermined distance from each other without hindering the display of the liquid crystal display element 20. For example, the resin structures 27 may be spaced by a constant distance from each other based on predetermined arrangement rules such as a matrix arrangement, and each of the resin structures 27 may have a dot-like form such as a columnar form having a circular, square or elliptic section. Alternatively, the resin structures 27 may be spaced by a predetermined distance from each other, and each of the resin structures 27 may have a stripe-like form. By employing the resin structures in the dot-like form, the adhesivity of the resin structures to both the substrates can be increased while keeping a high aperture ratio of the liquid crystal display element 20, and it is possible to produce the display element having a high strength against vibrations and bending. By employing the resin structure 27 in the stripe-like form, the aperture ratio becomes low as compared with the case of the dot-like form, but the adhesivity of the resin structures to the substrates increases owing to increase in area of adhesion to the substrates. Therefore, the display element itself can have a further increased strength. Further, the resin structure 27 in the stripe-like form provides dams within the liquid crystal layer so that flow and movement of the liquid crystal composition 28 in the liquid crystal layer can be prevented.

It is preferable that the dot-like resin structure has the maximum width of 200 $\mu$m or less in view of the adhesivity and the display characteristics, and has the maximum width larger than several micrometers, and more preferably 10 μm or more in view of easy manufacturing of the display element.

The size of the resin structure 27 is one of the factors for supporting the substrates and providing an appropriate adhesive force. In connection with this, if the adhered portion of the resin structure 27, which is already fixed to the substrates by the pressure and heat, occupies an area which is 10% or more with respect to the area of the light modulation region, it can provide a sufficient strength as the liquid crystal display element 20. With increase in rate of the area of the resin structure 27 with respect to the area of the light modulation region, the area of the light modulation portion decreases. However, the practically sufficient characteristics as the liquid crystal display element 20 can be achieved if the occupied rate of the resin structures is 40% or less.

Similarly to the dot-like form, the resin structure 27 in the stripe-like form may preferably have a line width in a range from several micrometers to 200 μm, and more preferably in a range from 10 μm to 200 μm.

In the liquid crystal display element 20 provided with the pixels which are formed by matrix electrodes, as is done in the display element 20 shown in FIG. 1, when the resin structures in the dot-like form are employed, such a structure is useful, for increasing the strength of the display element, that a plurality of resin structures are provided for each area of the pixel if the pixel is large. Also, if the pixel is small, such a structure is useful that each of the dot-like resin structures supports an area corresponding to the plurality of pixels. It is preferable that the dot-like resin structure is disposed between the electrodes with priority, because this increases the aperture ratio.

In the liquid crystal display element 20 provided with pixels formed by the matrix electrodes, when the resin structures in the stripe-like form are employed, it is preferable that each of the resin structures is located between and along the belt-like electrodes for increasing the aperture ratio as large as possible.

The liquid crystal composition 28 may be used in any one of the modes such as a twisted nematic (TN) mode, a super twisted nematic (STN) mode, a ferroelectric liquid crystal (FLC) mode, an in-plane switching (IPS) mode, a vertical align (VA) mode, an electrically controlled birefringence (ECB) mode, a cholesteric-nematic phase transfer guest-host mode, a polymer-dispersed liquid crystal mode and a cholesteric selective reflection mode.

The liquid crystal display element 20 described above can be manufactured, e.g., by the following method, although not restricted thereto.

Figure 2A:
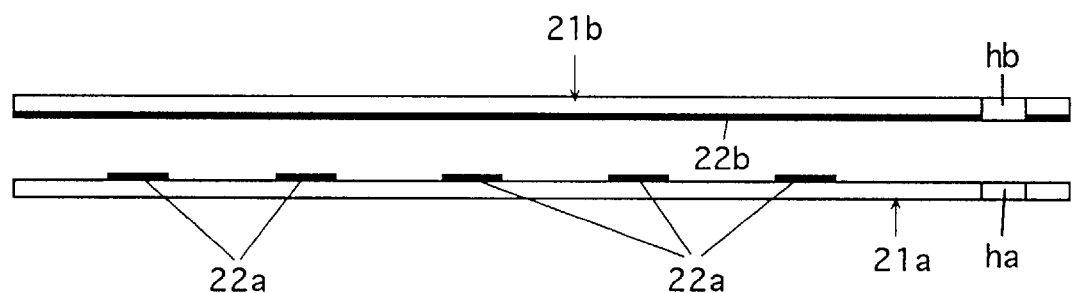
FIGS. 2(A)–2(C) show steps of preparing substrates before steps of applying a liquid crystal material and fixing substrates together, respectively.

First, as shown in FIG. 2(A), processing is performed to form the transparent electrodes 22a and 22b of a predetermined pattern on the substrates 21a and 21b, respectively. A commercially available substrate with a transparent electrode such as NESA glass may be used. At least one of the substrates 21a and 21b is the flexible substrate. In this embodiment, the substrate 21b has a flexibility. The flexible substrate (i.e., the substrate 21b in this embodiment) will be adhered to the other substrate (i.e., the substrate 21a) kept in the plane fashion in the substrate fixing step which will be described later. The respective substrates 21a and 21b has at its end portion with a pin aperture ha or hb for fitting a positioning pin 31a, which is provided in a substrate fixing device described later with reference to FIGS. 3 to 6, to the substrate.

Figure 2B:
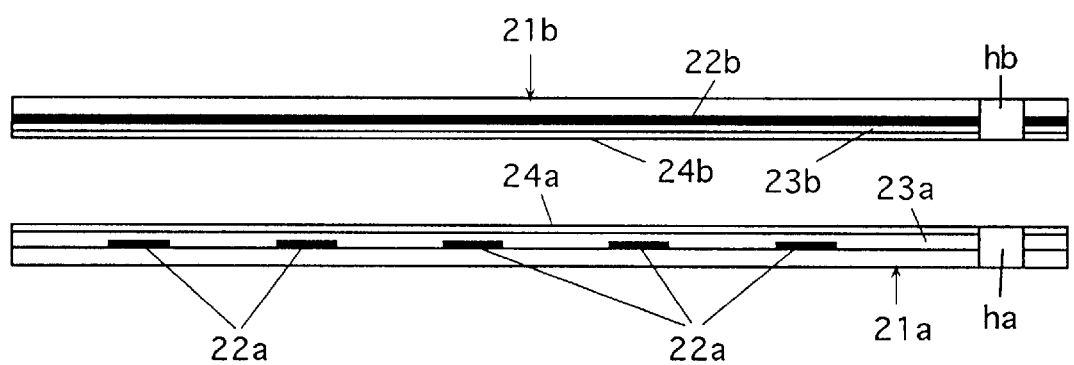

Then, as shown in FIG. 2(B), the insulating films 23a and 23b as well as the alignment films 24a and 24b are successively formed, if necessary, on the surfaces of the substrates 21a and 21b provided with the electrodes, respectively.

Figure 2C:
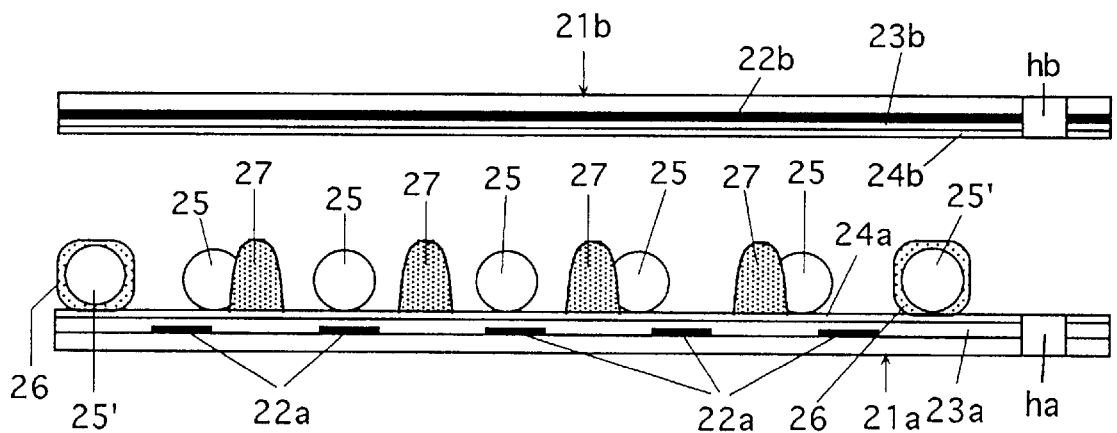

Then, as shown in FIG. 2(C), spacer particles 25 are dispersed or sprayed on the substrate 21a. The seal resin 26 containing the spacer particles 25' are applied onto the annular peripheral portion of the substrate 21a to form a seal wall. The resin structures 26 are formed in the inner display region surrounded by the seal resin 26 on the substrate 21a.

Although not restricted, the spacer particles 25 and 25' are made of the same material, and have the same constant particle diameter D in a range from $4 \times 10^{-3}$ mm to $10 \times 10^{-3}$ mm, i.e., from 4 μm to 10 μm in this embodiment.

The density N of the spacer particles 25 is in a range from 50 pcs/mm$^2$ to 400 pcs/mm$^2$. The rate S ($=\pi(D/2)^2 \cdot N$) of the area occupied by the spacer particles 25 to the unit area of the substrate 21a is in a range from 0.003 to 0.05.

The seal resin 26 and the resin structure 27 are made of the same thermoplastic polymer material.

The seal resin (seal wall) 26 and the resin structure 27 may be formed on the different substrates, respectively. In this case, the manufacturing method and/or the material of the seal resin 26 can be different from that of the resin structure 27. For example, the resin structure 26 may be formed in fine configuration at the display region with a screen plate or a metal mask, and a dispenser may be used in the region outside the display region for minimizing the amount of required resin. The resin material for the resin structures in the display region may be selected primarily in view of the precision and adhesion, and the resin material for the seal resin 26 may be selected in view of a high sealing performance for preventing mixing of external impurities into liquid crystal composition 28, with high reliability for a long term.

As shown in the figures, when the seal resin (seal wall) 26 and the resin structures 27 are made of the same polymer material, and also are formed on the same substrate, the steps of forming them can be simplified.

At least the seal resin 26, among the seal resin 26 and the resin structure 27, is preheated on the substrate 21a to attain a semi-hard state. In this semi-hard state, the resin component is partially hardened to reduce the flowability as well as the tack of the surface thereof. In the case where the seal resin 26 contains a solvent component, the above semi-hard state includes a state where the solvent component contained in the seal resin 26 has partially vaporized due to the heating so that the flowability and the tack of the surface are reduced. Further, the above semi-hard state includes a state where adhesivity is produced as a result that the seal resin 26 is pressed to be collapsed.

The substrates 21a and 21b, which have been prepared as described above, are fixed together to form the liquid crystal display element 20 with the substrate fixing device shown in FIGS. 3 to 6 while filling the space between the substrates with the liquid crystal composition 28. FIG. 7 is a schematic cross section showing the substrates and others in the substrate fixing step.

The substrate fixing device shown in FIGS. 3 to 6 will now be described.

The substrate fixing device is provided with a hot plate 30 carrying and moving the substrate 21a, a measuring discharge unit 40 for discharging a measured predetermined amount of the liquid crystal composition 28, a pressing and heating unit 50 for pressing and heating the two substrates 21a and 21b, and a holding unit 70 for holding a rear end of the second substrate 21b.

The hot plate 30 has, as shown in the figures, a heat insulation plate 33 as well as a suction table heater 32 and a suction table 31 layered successively on the plate 33. At the bottom surface of the heat insulation plate 33, there are arranged blocks 34 which can slide on rails 38 arranged on a base 100 as well as a nut block 34' which is engaged with a ball screw 35 driven by a drive source 36 such as a servo-motor or a speed control motor. As the ball screw 35 rotates forwardly or reversely, the nut block 34' engaged with the ball screw 35 moves together with the hot plate 30 in the direction along the rails 38 forwardly or reversely.

Figure 5:
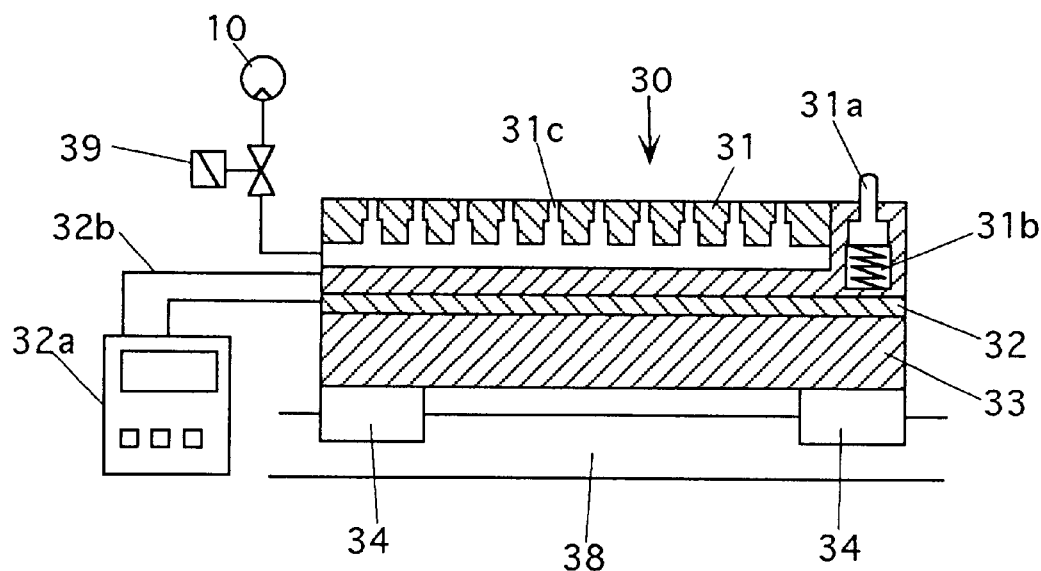
FIG. 5 is a schematic elevation showing the device in FIG. 3 with a certain part removed.

As shown in FIG. 5, the suction table 31 is provided with the pin 31a for positioning the substrate 21a. When the hot plate 30 slides and moves to a position opposed to a pressing roller 51 (FIG. 3) or the pressing and heating roller 52 (FIG. 3) in the pressing and heating unit 50 (FIG. 3), which will be described later, a coil spring 31b disposed behind the pin 31a is compressed to allow lowering of the pin 31a by the roller pressure so that a heavy load due to the pin 31a is not applied to the pressing roller 51 or the pressing and heating roller 52.

The hot plate 30 unmovably supports the substrate 21a owing to air suction of the vacuum pump 10 through the respective suction apertures 31c and a magnetic valve 39 shown in FIG. 5. Therefore, no holding member for holding the upper side of the substrate 21a is required so that the structure of the substrate fixing device can be simple, and smearing of the substrate 21a can be prevented. Even if the film substrate is employed, upward bending, expansion or waving of the substrate does not occur. If the holding member were employed for holding the upper side of the substrate, the holding member would hold the periphery of the substrate not for impeding the movement of the pressing roller 51 used for fixing the substrates. Accordingly, it would be very difficult to keep the whole substrate in a flat fashion, especially when the substrate is large and flexible.

A temperature sensor 32b is arranged at the vicinity of the suction table 31, and is connected to a temperature controller 32a, which turns on/off the heater 32 for controlling the temperature of the suction table 31.

At the vicinity of the rails 38, there are arranged position detectors 37 (see FIG. 4) such as a photosensor or a limit switch, which issue control signals to the drive source 36 for stopping the hot plate 30 or changing the speed thereof in a predetermined position.

Figure 3:
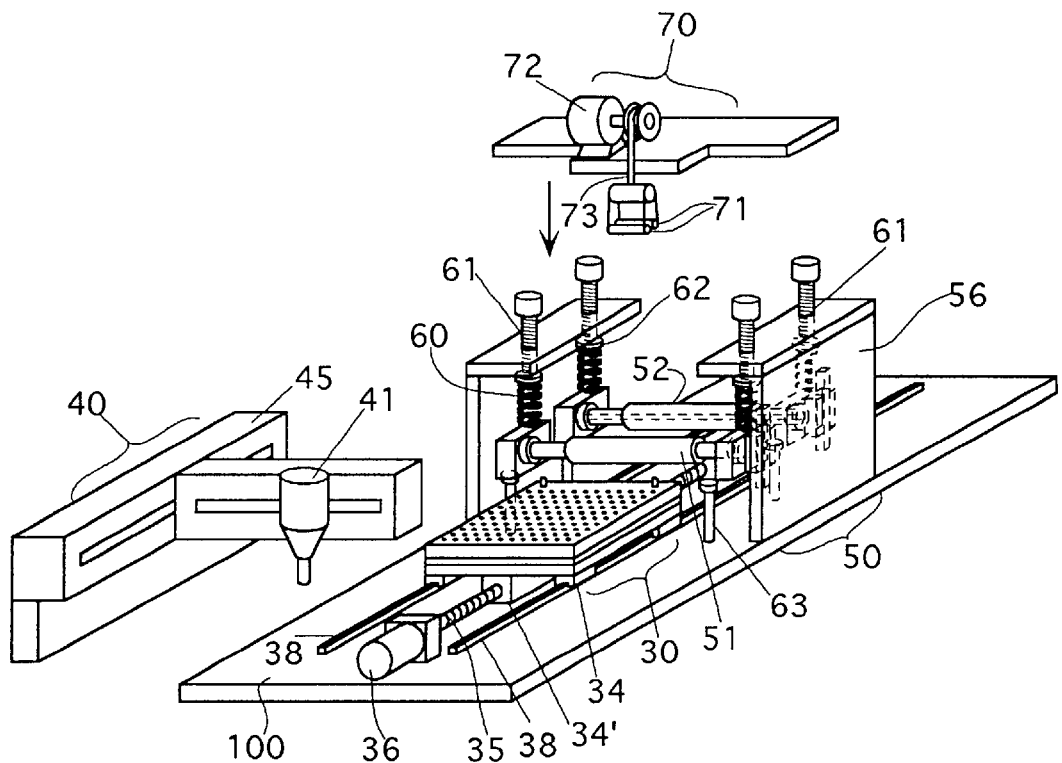
FIG. 3 is a perspective view showing an example of a substrate fixing device used in the method of the invention.
Figure 4:
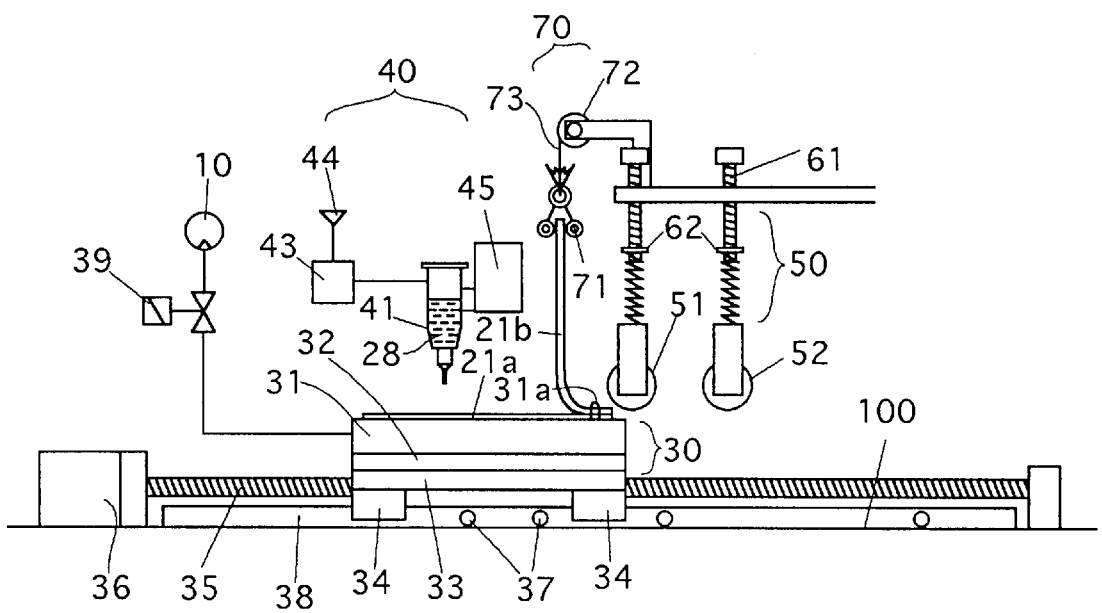
FIG. 4 is a schematic side view of the device shown in FIG. 3.

As shown in FIGS. 3 and 4, the measuring discharge unit 40 has a cylinder 41 which can accommodate inside thereof the liquid crystal composition and can discharge it from its outlet, a pneumatic source 44 for supplying the air into the cylinder 41, a control device 43 which controls the pneumatic source 44 for adjusting an amount of the liquid crystal composition discharged from the cylinder 41, and an X-Y robot mechanism 45 for moving the control device 43 and the cylinder 42 toward a predetermined position above the suction table 31 and stopping them there.

As shown in FIGS. 3 and 4, the pressing and heating unit 50 has two rollers, i.e., the pressing roller 51 and the pressing and heating roller 52. When the substrates 21a and 21b reach the position opposed to the rollers 51 and 52 in accordance with movement of the hot plate 30, the rollers 51 and 52 pushes the substrates 21a and 21b toward the hot plate 30 while heating them by the roller 52.

Figure 6:
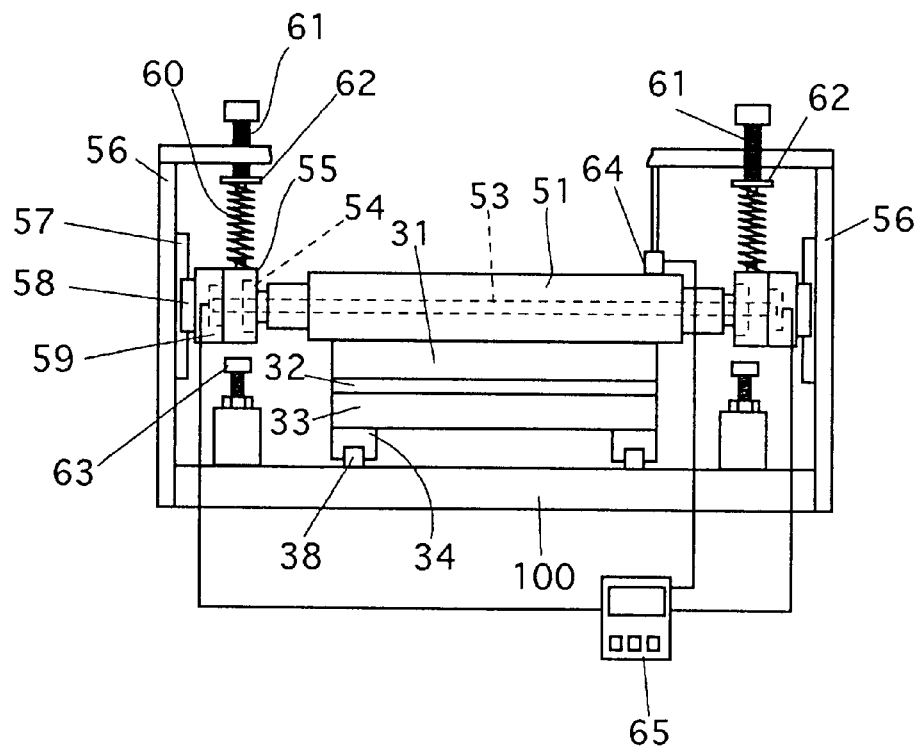
FIG. 6 is a cross section showing a hot plate portion of the device shown in FIG. 3.
Figure 7:
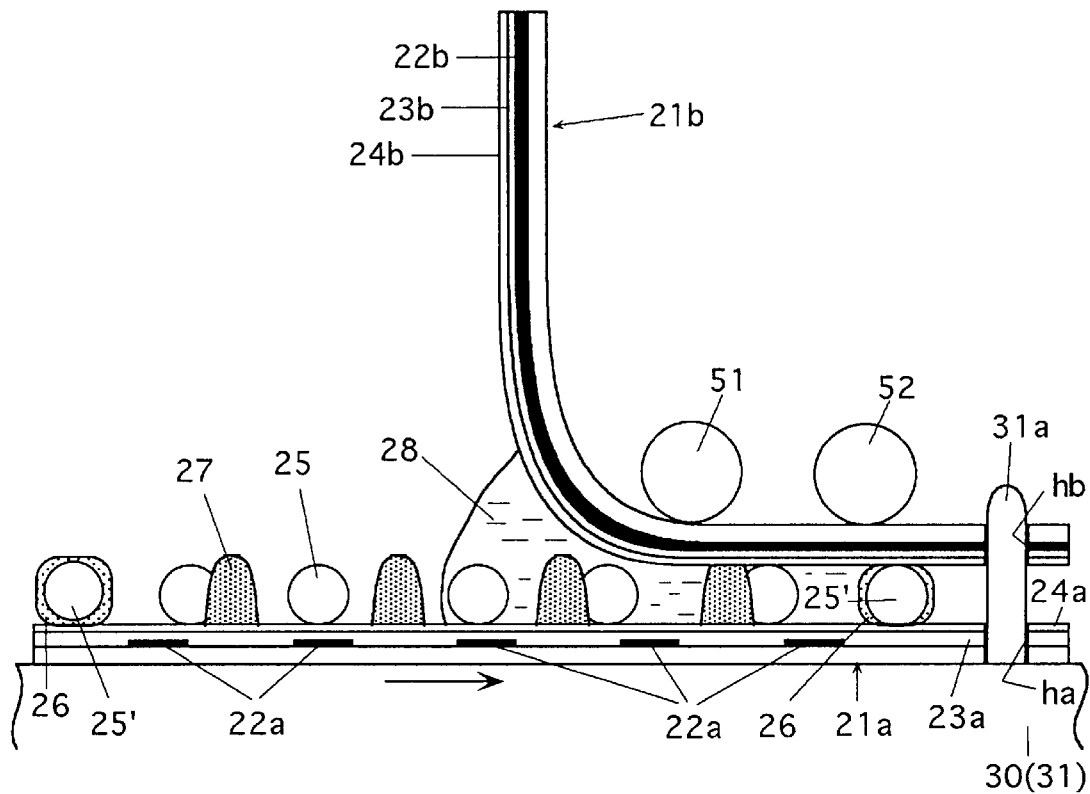
FIG. 7 is a cross section showing a manner of fixing the substrates together with a liquid crystal material therebetween.

As shown in FIG. 6, the opposite ends of the pressing roller 51 are supported by bearing holders 55 via bearings 54, respectively. Support plates 56 are arranged on the base 100, and each bearing holder 55 is connected via a connection block 59 to a block 58, which can slide along a rail 57 fixed to the support plate 56. Thereby, the pressing roller 51 is supported slidably in vertical direction at the position immediately above the hot plate 30.

Above the bearing holder 55, there is arranged a spring 60 for pushing the bearing holder 55 as well as an adjust bolt 61 for adjusting the compression of the spring 60. The adjust bolt 61 is engaged with the screw hole formed at the support plate 56, and is pushing the spring 60 through a stopper 62 provided at its lower end. Since the compressed length of the spring 60 can be changed by turning the adjust bolt 61, the pressing force of the pressing roller 51 can be adjusted so that a uniform pressure can be applied to the substrates 21a and 21b. A stopper 63 for preventing excessive pressure is arranged under the bearing holder 55. The pressing force applied by the pressing roller 51 is preferably set to be smaller than the pressing force of the pressing and heating roller 52.

The pressing and heating roller 52 and the support mechanism around it are similar to the pressing roller 51 and its support mechanism. However, the pressing and heating roller 52 has a hollow structure, in which a rod-like heater 53 is accommodated for heating the surface of the pressing and heating roller 52. A temperature sensor 64 of a non-contact or contact type is arranged at the vicinity of the surface of the pressing and heating roller 52, and is connected to a temperature controller 65 for controlling the surface temperature of the roller 52.

The pressing roller 51 and the pressing and heating roller 52 preferably have smooth surfaces having a releasability, and these surface layers are preferably formed of, e.g., silicon rubber layers, respectively.

The substrate holding unit 70 has a holding roller pair 71 for holding the rear end portion of the substrate 21b, and a motor-driven winch 72 for reeling in and out a wire 73 having an end connected to the holding roller pair 71. When the front end of the hot plate 30 reaches the position opposed to the pressing roller 51, the winch 72 starts the reeling off the wire 73, and lowers the holding roller pair 71 in accordance with the movement of the hot plate 30.

When the substrates is fixing to each other with the substrate fixing device described above, the substrate 21a already carrying the spacer particles 25, the seal resin 26 and the resin structures 26 is laid on the suction table 31 of the hot plate 30, and is positioned thereon by fitting the pin aperture ha, formed in the one end portion, through the positioning pin 31a, and held by a suction force. The suction table 31 is heated to a predetermined temperature under the control of the temperature control device 32a. The flexible substrate 21b is positioned by the positioning pin 31a fitted into the pin aperture hb so that the end of the substrate 21b is laid over the end of the substrate 21a, and the other end (rear end) is held by the holder roller pair 71 in the raised position for locating it in an upper position spaced from the substrate 21b.

One or more of the steps of disposing the spacer particles 25, disposing the seal resin 26 and disposing the resin structure 26 on the substrate 21a may be performed on this plate 30.

In the measuring discharge unit 40 for the liquid crystal composition, the cylinder 41 operates to scan successively in the surface opposed to the substrate 21a laid on the plate 30 for supplying the liquid crystal material onto the substrate 21a. In this operation, it is preferable to supply the liquid crystal material without forming spaces not for taking bubbles. The hot plate 30 which is the substrate support member is moved at a predetermined speed, and the substrate portion carrying the liquid crystal material is moved into the position opposed to the pressing roller 51 and the pressing and heating roller 52.

In this operation, the flexible substrate 21b moves together with the lower substrate 21a, and enters the positions opposed to the pressing roller 51 and the pressing and heating roller 52 in accordance with the movement of the hot plate 30. In accordance with the above entry into the opposed positions, the winch 72 of the substrate holding unit 70 reels out the wire 73 so that the rear end of the substrate 21b supported by the substrate holding roller pair 71 lowers toward the hot plate 30. During the fixing of the substrates, the substrate 21b is positioned to space its rear end from the substrate 21a, and provides a predetermined angle with respect to the substrate 21a. Thereby, entry of the bubbles into a portion between the substrates can be prevented during the substrate fixing step.

In this manner, the upper and lower substrates are continuously fixed together with the pressing roller 51 and the pressing and heating roller 52, while the space between the upper and lower substrates is filled with the liquid crystal composition 28, and the gap between the substrates is adjusted. In this operation, the seal resin 26 and the resin structures 26 are pressed to an extent determined by the spacer particles 25, and are adhered onto both the substrates. In the initial stage of the process of supplying the liquid crystal material, a relatively large amount of the liquid crystal material 28 may be supplied, and then may be spread to the remaining region on the substrate by the pressing roller 51 when fixing the substrates together.

When the operation of fixing substrates proceeds, and when the holding roller pair 71 lowers to the vicinity of the hot plate 30, the winch 72 stops, and thereafter the rear end of the substrate 21b is disengaged from the holding roller pair 71 owing to the resistance of the pin 31a. Then, the rear end of the substrate 21b moves through the pressing and pressing/heating roller unit 50, and thereby the substrate fixing operation ends. At the same time, the production of the liquid crystal display element ends. Thereafter, portions of the substrates provided with the pin holes ha and hb are cut off.

In the above substrate fixing operation, the following conditions are employed.

The pressure (pressing force) P of the heating and pressing roller 52 is in a range from 20 gf/mm$^2$ to 100 gf/mm$^2$, and the pressure of the pressing roller 51 is slightly smaller than the pressure P of the heating and pressing roller 52.

The relative moving speed V of the pressing roller 51 and the heating and pressing roller 52 with respect to the hot plate 30 is in a range from 10 mm/sec to 50 mm/sec.

The temperature T of the heating and pressing roller 52 is set in a range from 120° C. to 160° C.

The impulse F=P/(V·N) [gf·sec] applied to each of the spacer particles 25 is in a range from 0.001 gf·sec to 0.1 gf·sec, where N is in the foregoing range from 50 pcs/mm$^2$ to 400 pcs/mm$^2$.

The parameter X (=(T−20)/(V·D)) relating to the heating by the heating and pressing roller 52 is in a range from 200 to 3000 (200≦X≦3000).

In the operation of fixing the substrates 21a and 21b, if each of the substrates is a film substrate, and therefore has a larger thermal expansion coefficient than the glass substrate, a difference in size occurs between the upper and lower substrates 21a and 21b if a large difference in temperature is present between the hot plate 30 and the pressing and heating roller 52. This may result in problems such as an error in position of the fixed substrates or distortions in the liquid crystal display element 20. Accordingly, it is desired to heat the substrates to an appropriate temperature by the hot plate 30. This can also reduce a time required for heating and adhering of the substrates, and can also improve the adhesive force between the substrates.

In the method of manufacturing the liquid crystal display element 20 described above, the liquid crystal display element can be manufactured simply with a short manufacturing time and good productivity. Further, the gaps between the substrates can be uniform, and occurrence of the bubbles between the substrates can be sufficiently suppressed so that the liquid crystal display element can have further improved display performance.

Description will now be given on specific examples in which the liquid crystal display elements are produced with the substrate fixing device shown in FIGS. 3 to 6 for the substrate fixing step.

The examples according to the invention described below commonly employ the following conditions.

Substrates 21a and 21b, and Electrodes 22a and 22b
    PES substrate with ITO film (SUMILIGHT FST-5352, manufactured by Sumitomo Bakelite Corp.)

Insulating Films 23a and 23b
    Oxide silicon thin film of 1000 Å in thickness

Alignment Films 24a and 24b
    Polyimide thin film (SE-610 of 500 Å in thickness, manufactured by Nissan Kagaku Kogyo Corp.)

Liquid Crystal Composition
    Nematic liquid crystal (MLC-6080-000, manufactured by Melc Corp.) and 2.3 weight % of chiral material (S811, manufactured by Melc Corp.) added thereto.

Spacer 25
    Polystyrene-contained cross-linked polymer spacer (MICROPEARL SP-2065 of about 6.5 $\mu$m in diameter, manufactured by Sekisui Finechemical Corp.)

Seal Resin 26
    Material: thermoplastic polyester resin (ARONMELT PES360SA40, manufactured by Three Bond Corp.)
    Configuration before fixing: width=0.5 mm, height=20 $\mu$m Resin Structure 26
    Material: the same as the seal resin
    Configuration and arrangement before fixing of the substrates: columnar form of 8 $\mu$m in a height having a circular section of 40 $\mu$m in a diameter, and arranged in a grid form with a pitch of 300 $\mu$m.

In each example, P represents the pressure by the heating and pressing roller 52. P' represents the pressure by the pressing roller 51. V represents the substrate fixing speed. N represents the spacer particle density. D represents the particle diameter ($\mu$m) of the spacer particle. T represents the heating temperature achieved by the heating and pressing roller 52. F represents the impulse applied each of the spacer particles during the substrate fixing, and expressed by P/(V·N). X represents a parameter expressed by ((T−20)/(V·D)) and relating to the heating by the heating and pressing roller 52. S represents an area ratio of occupied area by the spacer particles to the unit substrate area, and is expressed by $\pi(D/2)^2 \cdot N$.

The speed V can also be considered as the relative moving speed of the roller for pressing (i.e., the pressing roller 51 as well as the pressing and heating roller 52) with respect to the substrate, and therefore can be considered as the pressure moving speed.

Further, the speed V can also be considered as the relative moving speed of the roller for heating (i.e., the pressing and heating roller 52) with respect to the substrate, and therefore can be considered as the heating moving speed.

| | P gf/mm$^2$ | P' gf/mm$^2$ | V mm/sec | P pcs/mm$^2$ | D μm | T °C. | F gf·sec | X | S |
|---|---|---|---|---|---|---|---|---|---|
| EX 1 | 30.0 | 10.0 | 20.0 | 200 | 9 | 130 | 0.0075 | 611 | 0.0127 |
| EX 2 | 80.0 | 10.0 | 50.0 | 200 | 9 | 130 | 0.008 | 244 | 0.0127 |
| EX 3 | 30.0 | 10.0 | 20.0 | 200 | 9 | 150 | 0.0075 | 722 | 0.0127 |
| EX 4 | 30.0 | 10.0 | 20.0 | 400 | 5 | 130 | 0.00375 | 1100 | 0.00785 |
| CX 1 | 8.0 | 10.0 | 50.0 | 200 | 9 | 130 | 0.0008 | 244 | 0.0127 |
| CX 2 | 30.0 | 10.0 | 10.0 | 400 | 5 | 180 | 0.0075 | 3200 | 0.00785 |
| CX 3 | 30.0 | 10.0 | 20.0 | 100 | 5 | 130 | 0.015 | 1100 | 0.00196 |

EX: example according to the invention
CX: example for comparison

In each of the liquid crystal display elements of the examples EX1 to EX4 according to the invention, the gap between the substrates and therefore the thickness were uniform, and no bubble was found in the display element.

In the display element of the comparative example CX1, the bubble was not found, but irregularities in gap between the substrates were found. Bubbles were found in the display elements of the comparative examples CX2 and CX3.

Figure 8A:
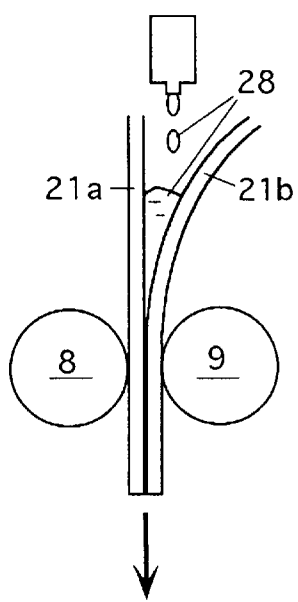
FIGS. 8(A) and 8(B) show two additional examples of the manner of fixing the substrates together.
Figure 8B:
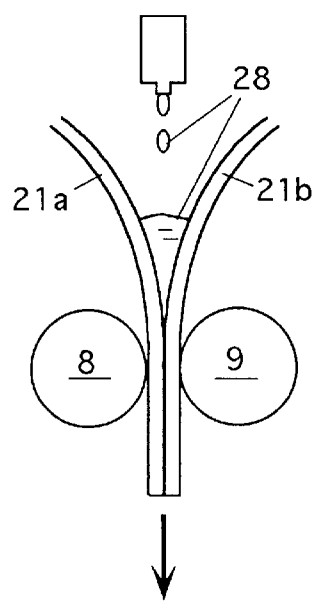

The liquid crystal display element shown in FIG. 1 may be produced by fixing the substrates together in the manner shown in FIGS. 8(A) or 8(B). The substrates 21a and 21b, on which the electrodes, the resin structures, the, seal wall and others are already formed, may be fixed together by moving them downward through the position between the two rollers 8 and 9 opposed to each other while overlapping the substrates 21a and 21b. In this example, the substrates 21a and 21b receive the pressure and the heat from the rollers 8 and 9 when moving through the position between the rollers 8 and 9. Thus, each of the rollers 8 and 9 in this example is the pressing and heating roller for performing the pressing and heating. The liquid crystal material 28 is dropped to a position between the substrates during the operation of fixing the substrates together. In this example, the spacer particles are dispersed at a predetermined density onto at least one of the substrates 21a and 21b before fixing these substrates together. Alternatively, the spacer particles may be dispersed in the liquid crystal material 28 which will be supplied to the position between the substrates.

In the substrate fixing operation, only one of substrates (21b) may be the flexible substrate as shown in FIG. 8(A), or both the substrates 21a and 21b may be the flexible substrates as shown in FIG. 8(B). In either case, the substrates 21a and 21b are continuously fixed together while bending at least one of the substrates, and thereby the remaining of the bubble between the substrates can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a liquid crystal display element provided with spacer particles and a liquid crystal material disposed between first and second substrates, comprising:

an adhesive material disposing step of disposing an adhesive material on a predetermined portion of at least one of said first and second substrates;

a spacer particle disposing step of disposing said spacer particles on at least one of said first and second substrates;

a liquid crystal material supplying step of supplying said liquid crystal material onto a predetermined portion of at least one of said first and second substrates; and a substrate fixing step of fixing said first and second substrates together with said adhesive material, said spacer particles and said liquid crystal material therebetween; wherein a flexible substrate is used for at least one of said first and second substrates; and said substrate fixing step is performed in such a manner that said first and second substrates are fixed together by applying a pressure to said first and second substrates from an end portion toward the other end portion thereof under a condition that an impulse F applied to each of said spacer particles is in a range from 0.001 gf·sec to 0.1 gf·sec.

2. A method of manufacturing the liquid crystal display element according to claim 1, wherein a pressure P applied to said substrates in said substrate fixing step is in a range from 20 gf/mm$^2$ to 100 gf/mm$^2$.

3. A method of manufacturing the liquid crystal display element according to claim 1, wherein a fixing speed of said first and second substrates in said substrate fixing step is in a range from 10 mm/sec to 50 mm/sec.

4. A method of manufacturing the liquid crystal display element according to claim 1, wherein said spacer particle disposing step is performed to dispose the spacer particles such that a density N of said spacer particles, to be located between said substrates in said substrate fixing step, is in a range from 50 pcs/mm$^2$ to 400 pcs/mm$^2$.

5. A method of manufacturing the liquid crystal display element according to claim 1, further comprising a step of:

forming a resin structure, to be arranged between said first and second substrates, on at least one of said first and second substrates before said substrate fixing step.

6. A method of manufacturing the liquid crystal display element according to claim 1, wherein said substrate fixing step is performed to fix said first and second substrates together while heating at least one of said first and second substrates.

7. A method of manufacturing a liquid crystal display element provided with spacer particles and a liquid crystal material disposed between first and second substrates, comprising:

an adhesive material disposing step of disposing an adhesive material on a predetermined portion of at least one of said first and second substrates;

a spacer particle disposing step of disposing said spacer particles on at least one of said first and second substrates;

a liquid crystal material supplying step of supplying said liquid crystal material onto a predetermined portion of at least one of said first and second substrates; and a substrate fixing step of fixing said first and second substrates together with said adhesive material, said spacer particles and said liquid crystal material therebetween, wherein a flexible substrate is used for at least one of said first and second substrates;

said substrate fixing step is performed in such a manner that said first and second substrates are fixed together by applying pressure and heat to said first and second substrates from an end portion toward the other end portion thereof; and a parameter x relating to the heating in said substrate fixing step satisfies a relationship of $200 \leq X \leq 3000$, where $X=(T-20)/(V \cdot D)$, T is a heating temperature (°C.), V is a fixing speed (mm/sec) of said first and second substrates, and D is a diameter of said spacer particles (mm).

8. A method of manufacturing the liquid crystal display element according to claim 7, wherein said fixing speed V is in a range from 10 mm/sec to 50 mm/sec.

9. A method of manufacturing the liquid crystal display element according to claim 7, wherein said heating temperature T is in a range from 120° C. to 160° C.

10. A method of manufacturing the liquid crystal display element according to claim 7, wherein said diameter D of said spacer particles is in a range from $4 \times 10^{-3}$ mm to $10 \times 10^{-3}$ mm.

11. A method of manufacturing the liquid crystal display element according to claim 7, further comprising a step of:

forming a resin structure, to be arranged between said first and second substrates, on at least one of said first and second substrates before said substrate fixing step.

12. A method of manufacturing a liquid crystal display element provided with spacer particles and a liquid crystal material disposed between first and second substrates, comprising:

an adhesive material disposing step of disposing an adhesive material on a predetermined portion of at least one of said first and second substrates;

a spacer particle disposing step of disposing said spacer particles on at least one of said first and second substrates;

a liquid crystal material supplying step of supplying said liquid crystal material onto a predetermined portion of at least one of said first and second substrates; and a substrate fixing step of fixing said first and second substrates together with said adhesive material, said spacer particles and said liquid crystal material therebetween; wherein a flexible substrate is used for at least one of said first and second substrates;

said substrate fixing step is performed in such a manner that said first and second substrates are fixed together by applying a pressure to said first and second substrates from an end portion toward the other end portion thereof; and said spacer particle disposing step is performed to dispose said spacer particles such that said spacer particles, to be located between said first and second substrates in said substrate fixing step, occupy an area at a ratio S of 0.003 or more to a unit area of said substrate.

13. A method of manufacturing the liquid crystal display element according to claim 12, wherein said spacer particle disposing step is performed to dispose the spacer particles such that a density N of said spacer particles, to be located between said substrates in said substrate fixing step, is in a range from 50 pcs/mm² to 400 pcs/mm².

14. A method of manufacturing the liquid crystal display element according to claim 12, wherein a diameter of said spacer particles is in a range from 4 μm to 10 μm.

15. A method of manufacturing the liquid crystal display element according to claim 12, further comprising a step of:

forming a resin structure, to be arranged between said first and second substrates, on at least one of said first and second substrates before said substrate fixing step.

16. A method of manufacturing the liquid crystal display element according to claim 12, wherein said substrate fixing step is performed to fix said first and second substrates together while heating at least one of said first and second substrates.

17. A method of manufacturing the liquid crystal display element according to claim 1, wherein said second substrates between said first and second substrates, is the flexible substrate; and said substrate fixing step is performed such that:

said first substrate is supported and kept flat by a support member;

said flexible second substrate is bent, and an end portion of said second substrate is overlapped with said first substrate supported by said support member with said adhesive material, said spacer particles and said liquid crystal material therebetween; and by moving at least one pressing member relatively to said first substrate supported by said support member, said first and second substrates are fixed together while said flexible second substrate is pressed toward said first substrate from an end portion toward the other end portion thereof.

18. A method of manufacturing the liquid crystal display element according to claim 17, wherein said substrate fixing step is performed such that: by moving at least one heating member relatively to said first substrate supported by said support member, said first and second substrate are fixed together while the heat is applied, from said second substrate side, to said first and second substrates from an end portion toward the other end portion thereof.

19. A method of manufacturing the liquid crystal display element according to claim 7, wherein said second substrate, as between said first and second substrates, is the flexible substrate; and said substrate fixing step is performed such that:

said first substrate is supported and kept flat by a support member;

said flexible second substrate is bent, and an end portion of said second substrate is overlapped with said first substrate supported by said support member with said adhesive material, said spacer particles and said liquid crystal material therebetween; and by moving at least one pressing member relatively to said first substrate supported by said support member, said first and second substrates are fixed together while said flexible second substrate is pressed toward said first substrate from an end portion toward the other end portion thereof.

20. A method of manufacturing the liquid crystal display element according to claim 19, wherein said substrate fixing step is performed such that: by moving at least one heating member relatively to said first substrate supported by said support member, said first and second substrate are fixed together while the heat is applied, from said second substrate side, to said first and second substrates from an end portion toward the other end portion thereof.

21. A method of manufacturing the liquid crystal display element according to claim 12, wherein said second substrate, as between said first and second substrates, is the flexible substrate; and said substrate fixing step is performed such that:

said first substrate is supported and kept flat by a support member;

said flexible second substrate is bent, and an end portion of said second substrate is overlapped with said first substrate supported by said support member with said adhesive material, said spacer particles and said liquid crystal material therebetween; and by moving at least one pressing member relatively to said first substrate supported by said support member, said first and second substrates are fixed together while said flexible second substrate is pressed toward said first substrate from an end portion toward the other end portion thereof.

22. A method of manufacturing the liquid crystal display element according to claim 21, wherein said substrate fixing step is performed such that: by moving at least one heating member relatively to said first substrate supported by said support member, said first and second substrate are fixed together while the heat is applied, from said second substrate side, to said first and second substrates from an end portion toward the other end portion thereof.

23. A method of manufacturing the liquid crystal display element according to claim 1, wherein said substrate fixing step is performed such that: by passing said first and second substrates through a position between a pair of pressing members opposed to each other, said first and second substrates are overlapped with said adhesive material, said spacer particles and said liquid crystal material therebetween for fixing said first and second substrates together.

24. A method of manufacturing the liquid crystal display element according to claim 23, wherein at least one of said pair of pressing members used in said substrate fixing step also serves as a heating member, and said substrate fixing step is performed such that said first and second substrates are fixed together while applying the pressure and heat to said first and second substrates from an end portion toward the other end portion thereof.

25. A method of manufacturing the liquid crystal display element according to claim 7, wherein said substrate fixing step is performed such that: by passing said first and second substrates through a position between a pair of pressing members opposed to each other, said first and second substrates are overlapped with said adhesive material, said spacer particles and said liquid crystal material therebetween for fixing said first and second substrates together.

26. A method of manufacturing the liquid crystal display element according to claim 25, wherein at least one of said pair of pressing members used in said substrate fixing step also serves as a heating member, and said substrate fixing step is performed such that said first and second substrates are fixed together while applying the pressure and the heat to said first and second substrates from an end portion toward the other end portion thereof.

27. A method of manufacturing the liquid crystal display element according to claim 12, wherein said substrate fixing step is performed such that: by passing said first and second substrates through a position between a pair of pressing members opposed to each other, said first and second substrates are overlapped with said adhesive material, said spacer particles and said liquid crystal material therebetween for fixing said first and second substrates together.

28. A method of manufacturing the liquid crystal display element according to claim 27, wherein at least one of said pair of pressing members used in said substrate fixing step also serves as a heating member, and said substrate fixing step is performed such that said first and second substrates are fixed together while applying the pressure and a heat to said first and second substrates from an end portion toward the other end portion thereof.

29. A method of manufacturing the liquid crystal display element according to claim 1, wherein said substrate fixing step is performed such that said flexible substrate is fixed to the other substrate while said flexible substrate is bending.

30. A method of manufacturing the liquid crystal display element according to claim 7, wherein said substrate fixing step is performed such that said flexible substrate is fixed to the other substrate while said flexible substrate is bending.

31. A method of manufacturing the liquid crystal display element according to claim 12, wherein said substrate fixing step is performed such that said flexible substrate is fixed to the other substrate while said flexible substrate is bending.

* * * * *

UNITED STATES PATENT AND TRADEMARK OFFICE
CERTIFICATE OF CORRECTION

PATENT NO. : 6,392,736 B1
DATED : May 21, 2002
INVENTOR(S) : Keiichi Furukawa et al.

It is certified that error appears in the above-identified patent and that said Letters Patent is hereby corrected as shown below:

<u>Title page,</u>
Item [57], ABSTRACT,
Line 5, after "adhesive", insert -- , --.
Line 15, after "area", insert -- at --.

<u>Column 8,</u>
Line 29, after "described", insert -- in --.

<u>Column 10,</u>
Lines 66 and 67, delete "knowledges", and insert -- knowledge --.

<u>Column 16,</u>
Lines 5 and 21, delete "26", and insert -- 27 --.

<u>Column 19,</u>
Line 18, delete "26", and insert -- 27 --.

<u>Column 20,</u>
Line 40, delete "26", and insert -- 27 --.

<u>Column 21,</u>
The heading of the fourth column of the table of examples, delete
"P
pcs/
$mm^2$",
and insert
-- N
pcs/
$mm^2$ --.

Line 32, after the second instance of "the", delete ",".

UNITED STATES PATENT AND TRADEMARK OFFICE
CERTIFICATE OF CORRECTION

PATENT NO.    : 6,392,736 B1
DATED         : May 21, 2002
INVENTOR(S)   : Keiichi Furukawa et al.

It is certified that error appears in the above-identified patent and that said Letters Patent is hereby corrected as shown below:

Column 24,
Line 18, delete "second substrates between", and insert -- second substrate, as between --.

Column 26,
Line 34, after "and" delete "a" and insert -- the --.

Signed and Sealed this

Thirteenth Day of May, 2003

JAMES E. ROGAN
*Director of the United States Patent and Trademark Office*